(12) United States Patent
Yu et al.

(10) Patent No.: US 10,791,166 B2
(45) Date of Patent: Sep. 29, 2020

(54) METHOD AND DEVICE FOR PROCESSING PERSISTENT CONNECTION ESTABLISHMENT REQUEST

(71) Applicant: WANGSU SCIENCE & TECHNOLOGY CO., LTD., Shanghai (CN)

(72) Inventors: Shengshui Yu, Shanghai (CN); Zhangkun Lin, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/328,943

(22) PCT Filed: Aug. 2, 2017

(86) PCT No.: PCT/CN2017/095551
§ 371 (c)(1),
(2) Date: Feb. 27, 2019

(87) PCT Pub. No.: WO2019/006808
PCT Pub. Date: Jan. 10, 2019

(65) Prior Publication Data
US 2019/0245914 A1 Aug. 8, 2019

(30) Foreign Application Priority Data
Jul. 7, 2017 (CN) .......................... 2017 1 0550234

(51) Int. Cl.
*G06F 15/173* (2006.01)
*H04L 29/08* (2006.01)
*H04L 29/06* (2006.01)

(52) U.S. Cl.
CPC ........ *H04L 67/1008* (2013.01); *H04L 67/141* (2013.01); *H04L 67/42* (2013.01); *H04L 69/162* (2013.01)

(58) Field of Classification Search
CPC ....... H04L 67/02; H04L 67/42; H04L 67/141; H04L 67/32; H04L 67/10; H04L 67/28;
(Continued)

(56) References Cited

U.S. PATENT DOCUMENTS 9,756,086 B1 * 9/2017 McHugh ............. H04L 67/1004
2005/0154733 A1 * 7/2005 Meltzer ................ G06F 21/554
(Continued)

FOREIGN PATENT DOCUMENTS

| CN | 102916953 A | 2/2013 |
|---|---|---|
| CN | 105721342 A | 6/2016 |
| CN | 105763634 A | 7/2016 |

OTHER PUBLICATIONS

The European Patent Office (EPO) the Extended European Search Report for 17916475.1 dated Dec. 5, 2019 7 Pages.
(Continued)

*Primary Examiner* — Michael A Keller
*Assistant Examiner* — Thao D Duong
(74) *Attorney, Agent, or Firm* — Anova Law Group, PLLC

(57) ABSTRACT

Method, server, and storage medium for processing a persistent connection establishment request are provided. The method includes: receiving the persistent connection establishment request sent by a client; determining a first processing process with a lowest number of current persistent connections, based on a locally stored number of current persistent connections of each processing process; and using the first processing process to process the persistent connection establishment request.

5 Claims, 5 Drawing Sheets

(58) Field of Classification Search
CPC .......................... H04L 67/2833; Y02D 70/00; Y02D 70/1224; Y02D 70/1242; Y02D 70/1262; Y02D 70/1264; Y02D 70/142
See application file for complete search history.

(56) References Cited

U.S. PATENT DOCUMENTS

2006/0089996 A1    4/2006  Peiffer
2017/0171086 A1*  6/2017  Jones .................... H04L 47/828

OTHER PUBLICATIONS

The World Intellectual Property Organization (WIPO) International Search Report for PCT/CN2017/095551 dated Mar. 23, 2018 5 Pages.

* cited by examiner

METHOD AND DEVICE FOR PROCESSING PERSISTENT CONNECTION ESTABLISHMENT REQUEST

CROSS-REFERENCES TO RELATED APPLICATIONS

This application is a national phase entry under 35 U.S.C § 371 of International Application No. PCT/CN2017/095551, filed on Aug. 2, 2017, which claims priority of Chinese Patent Application No. 2017105502347, filed with the State Intellectual Property Office of P. R. China on Jul. 7, 2017, the entire content of all of which is incorporated herein by reference.

FIELD OF THE DISCLOSURE

The present disclosure relates to the field of network communication technologies and, more particularly, relates to a method and a device for processing a persistent connection establishment request.

BACKGROUND

As the network technologies develop rapidly, the network services are becoming more diversified and complicated. Currently, the network services based on the TCP (Transmission Control Protocol) connection may include two connection modes: persistent connection and multiple connections.

The persistent connections are usually applied to point-to-point communication showing frequent operations. The user terminal may establish a TCP connection with the client provided by the service supplier, and meanwhile, the client may establish a TCP connection with a server.

After the aforementioned TCP connection is established and before it is released, it can be ensured that the TCP connection stays connected. As such, when data interaction demand exists between the user terminal and the server, data interaction with the server may be performed through the client, and in each data interaction, data packet(s) may be sent based on the established TCP connection without the TCP connection being re-established. Accordingly, processing resources consumed by establishment of the TCP connection may be effectively saved.

During the process of implementing the present disclosure, the inventors discover at least following issues in existing technologies.

After the client establishes the persistent connection with the server, the server often maintain persistent connections with several clients, respectively, through a plurality of processes. Due to the randomness of the services initiated by the user terminal, the situation in which a specific processing process of the server is overloaded while other processing processes are in an idle state may occur. Thus, the utilization rate of the processing resources by the server is relatively low.

BRIEF SUMMARY OF THE DISCLOSURE

To solve issues in existing technologies, embodiments of the present disclosure provide a method and a device for processing a persistent connection establishment request. The technical solutions are as follows.

In a first aspect, a method for processing a persistent connection establishment request is provided, the method includes:

receiving a persistent connection establishment request sent by a client;

based on the locally stored number of current persistent connections of each processing process, determining a first processing process with the lowest number of current persistent connections;

using the first processing process to process the persistent connection establishment request.

Optionally, receiving the persistent connection establishment request sent by the client comprises:

determining a second processing process based on a preset receiving order, and receiving the persistent connection establishment request sent by the client through the second processing process.

Optionally, the method further includes:

through the second processing process, using SOCKET to forward the persistent connection establishment request to a managing process; and based on the locally stored number of current persistent connections of each processing process, determining the first processing process with the lowest number of current persistent connections includes:

based on the locally stored number of current persistent connections of each processing process, determining the first processing process with the lowest number of current persistent connections through the managing process.

Optionally, after receiving the persistent connection establishment request sent by the client, the method further comprises:

if the persistent connection establishment request carries identification information of a third processing process, using the third processing process to process the persistent connection establishment request; and based on the locally stored number of current persistent connections of each processing process, determining the first processing process with the lowest number of current persistent connections includes:

if the persistent connection establishment request does not carry identification information of any processing process, based on the locally stored number of current persistent connections of each processing process, determining the first processing process with the lowest number of current persistent connections.

Optionally, based on the locally stored number of current persistent connections of each processing process, determining the first processing process with the lowest number of current persistent connections comprises:

based on the locally stored number of current persistent connections of each processing process, determining a preset number of processing processes with the lowest number of current persistent connections;

acquiring identification information of the client carried in the persistent connection establishment request, and determining the first processing process with the lowest number of current persistent connections established with the client, among the preset number of the processing processes.

In a second aspect, a device for processing a persistent connection establishment request is provided, the device includes:

a receiving module, for receiving a persistent connection establishment request sent by a client;

a determination module for, based on the locally stored number of current persistent connections of each processing process, determining a first processing process with a lowest number of current persistent connections;

a processing module, for using the first processing process to process the persistent connection establishment request.

Optionally, the receiving module is specifically configured to:

determine a second processing process based on a preset receiving order, and receive the persistent connection establishment request sent by the client through the second processing process.

Optionally, the device further includes:

a forwarding module for, through the second processing process, using SOCKET to forward the persistent connection establishment request to a managing process; and the determination module is specifically configured to:

based on the locally stored number of current persistent connections of each processing process, determining a first processing process with a lowest number of current persistent connections through the managing process.

Optionally, the processing module is further configured to:

after receiving the persistent connection establishment request sent by the client, if the persistent connection establishment request carries identification information of a third processing process, use the third processing process to process the persistent connection establishment request; and the determination module is specifically configured to:

if the persistent connection establishment request carries no identification information of any processing process, based on the locally stored number of current persistent connections of each processing process, determine the first processing process with the lowest number of current persistent connections.

Optionally, the determination module is specifically configured to:

based on the locally stored number of current persistent connections of each processing process, determine a preset number of processing processes with the lowest number of current persistent connections;

acquire identification information of the client carried in the persistent connection establishment request, and determine the first processing process with the lowest number of current persistent connections established with the client, among the preset number of the processing processes.

In the third aspect, a server is provided. The server includes a processor and a memory. The memory stores at least one instruction, at least one section of programs, a code set, or an instruction set. The at least one instruction, at least one section of programs, a code set or an instruction set is loaded by the processor and is executed to implement the method for processing a persistent connection establishment request, as described in the first aspect.

In the fourth aspect, a computer-readable storage medium is provided, and the storage medium stores at least one instruction, at least one section of programs, a code set or an instruction set. The at least one instruction, at least one section of programs, a code set or an instruction set is loaded by the processor and is executed to implement the method for processing a persistent connection establishment request, as described in the first aspect.

Beneficial effects brought about by the technical solutions provided by embodiments of the present disclosure are as follows.

In embodiments of the present disclosure, the server receives a persistent connection establishment request sent by the client, and based on the locally stored number of current persistent connections of each processing process, determines a first processing process with a lowest number of current persistent connection. Further, the first processing process processes the persistent connection establishment request. As such, when persistent connection needs to be established with the client, the server may, from all the processing processes, select the processing process that has the lowest load for processing, thereby enabling the loads of the plurality of processing processes to be balanced and improving the utilization rate of the processing resources by the server.

BRIEF DESCRIPTION OF THE DRAWINGS

To more clearly illustrate technical solutions in embodiments of the present disclosure, accompanying drawings to be used in the following embodiments will be introduced briefly. Obviously, the accompanying drawings described hereinafter are merely some embodiments of the present disclosure, and for those ordinarily skilled in the relevant art, other drawings may be derived from such drawings without contributing creative labor.

DETAILED DESCRIPTION

To more clearly describe the objectives, technical solutions and advantages of the present disclosure, implementations of the present disclosure is further illustrated in details with reference to the accompanying drawings in conjunction with embodiments.

Embodiments of the present disclosure provides a method for processing a persistent connection establishment request, and the execution body of the method may be a server. The server may be any server that provides network service, and the network service may be cloud broadband service, and cloud line service, etc. A plurality of processing processes responsible for network services may run on the server, and each processing process may support at least one persistent connection with the client. The at least one client herein may be client(s) provided by the service supplier, and may be distributed over different regions to assist execution of network services initiated by user terminals in each region.

Figure 1:
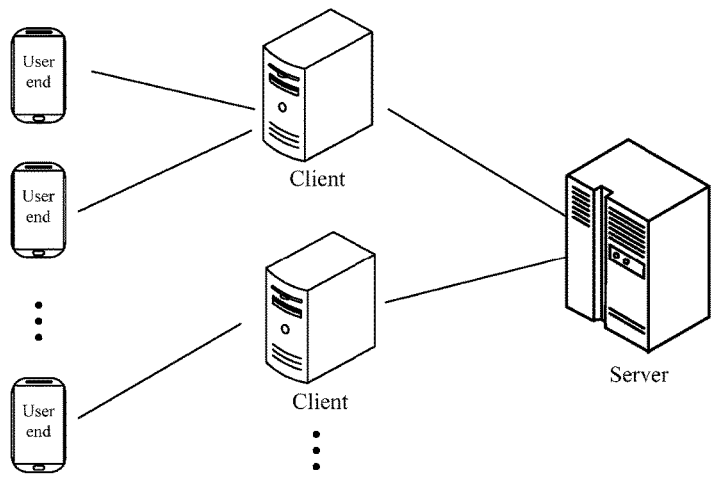
FIG. 1 illustrates a schematic view of a scenario in which a persistent connection establishment request is established according to embodiments of the present disclosure.

The specific scenario may refer to FIG. 1, where the user terminal may establish a connection with the aforementioned client, and perform data interaction with the client through the persistent connection between the client and the server.

The aforementioned server may include a processor, a memory and a transceiver. The processor may be configured to process a persistent connection establishment request in the following procedures. The memory may be configured to store data needed by the following processing procedure and the data generated thereof. The transceiver may be configured to receive and send related data in the following processing procedure, such as receive the information sent by the client, and return data to the client, etc.

Figure 2:
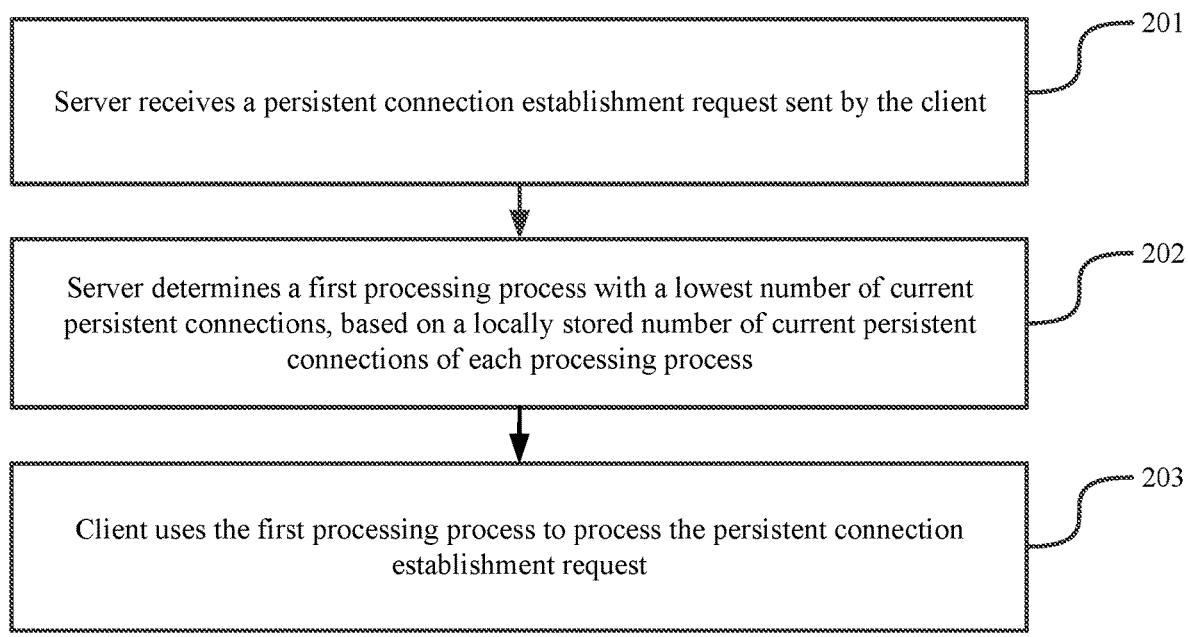
FIG. 2 illustrates a flow chart of a method for processing a persistent connection establishment request according to embodiments of the present disclosure.

With reference to the specific implementations described hereinafter, the processing procedure shown in FIG. 2 is illustrated in details, and the procedure is as follows.

At Step 201, the server receives a persistent connection establishment request sent by the client.

In the implementation, the service supplier of the network service may arrange clients in each region within the service coverage range to assist the user terminal in performing network service.

On one hand, a plurality of processing processes may run simultaneously on the client, and the processing processes may be primarily responsible for establishment/release of the persistent connection with the server and the sending of the persistent data. Each processing process of the client may establish a persistent connection with the server through the TCP protocol, and between each processing process of the client and the server, the establishment and release of the persistent connection are individual to each other, without mutual disturbance.

After the client enters a working status, the main process is started. Further, based on the configuration file, the managing process and the processing process are created by the main process, and the processing process listens to the service port to receive the network service data sent by the user terminal. Further, the client may forward the network service data sent by the user terminal to the server by establishing the persistent connection with the server. Here, the client may detect the loading condition of the current persistent connection, and if the load of the persistent connection reaches a threshold, the number of the persistent connections may increase dynamically, namely, a persistent connection establishment request may be sent to the server. Similarly, if during the detection process, the client discovers that the number of idle persistent connections is greater than a preset threshold, a part of the persistent connections may be released dynamically. The managing process of the client may be used to manage the processing processes, such as fault detection, and statistics of loading, etc.

On the other hand, a plurality of processing processes may run simultaneously on the server. More specifically, when the server operates, a main process may be started, and based on the configuration file, a managing process and processing processes may be created by the main process. Further, connections between the managing process and each processing process may be established, and the load information of each processing process may be recorded through the managing process. When the client detects that a new persistent connection needs to be established with the server, and after the client sends a persistent connection establishment request to the server, the server may receive the corresponding persistent connection establishment request.

Optionally, the server may receive the persistent connection establishment request through a plurality of processing processes in turn. Correspondingly, processing of Step 201 may be as follows: determining a second processing process based on a preset receiving order, and receiving the persistent connection establishment request sent by the client through the second processing process.

In implementation, the server may be configured with a uniform service port configured to receive a persistent connection establishment request. The plurality of processing processes may all listen to the service port, and when the persistent connection establishment request arrives, the server may awake a processing process (i.e., the second processing process) based on the preset receiving order, and further receives the persistent connection establishment request sent by the client through the second processing process. Here, the preset receiving order may be the arrangement order of the reference number of each processing process, or may be the size order of the number of the persistent connections already established by each processing process, or may even be other orders configured manually by technicians, etc. It is worth mentioning that, different from using a single listening process to listen to the service port, a plurality of processing processes may be selected herein to listen to the service port at the same time. Thus, the situations where the number of persistent connection establishment requests that undergo parallel processing by the server is relatively low due to the insufficient upper limit of the load of the listening process may be effectively avoided.

At Step 202, based on the locally stored number of current persistent connections of each processing process, the server determines a first processing process with a lowest number of current persistent connections.

In implementation, the managing process of the server may record load information of each processing process, and the load information may at least include the number of current persistent connections of each processing process. When one or more persistent connections are added to or deleted from a certain processing process, the managing process may modify the number of the persistent connections of the recorded processing process adaptively. As such, after the server receives the persistent connection establishment request sent by the client, the locally stored number of the persistent connections of each processing process may be first acquired, and the processing process having the lowest load may be selected. That is, the first processing process with the minimum persistent connections is determined.

Optionally, after the server receives the persistent connection establishment request through the second processing process, the persistent connection establishment request may be forwarded to the managing process, and the specific procedure may include: through the second processing process, using SOCKET to forward the persistent connection establishment request to the managing process. Correspondingly, the procedure of Step 202 may be as follows: based on the locally stored number of current persistent connections of each processing process, determining a first processing process with a lowest number of current persistent connections through the managing process.

In implementation, the server may enable a plurality of processing processes to listen to a service port by configuring the "SO_REUSEPORT" property of the SOCKET. Further, the server may implement communication between the processing processes and the managing process through the SOCKET, thereby achieving the objective of sharing information between processes. As such, in existing technologies, when each processing process shares the information, the loss in the system performance of the server caused by the usage of lock mechanism may be reduced. Based on the aforementioned procedures, the server determines the second processing process, and after using the second processing process to receive the persistent connection establishment request, the server may use the SOCKET to forward the persistent connection establishment request to the managing process of the server through the second processing process.

Further, the managing process of the server may receive the persistent connection establishment request forwarded by the second processing process, and thus may acquire the load information (i.e., the number of current persistent connections) of each processing process stored locally. Further, based on the acquired load information, the first processing process having the lowest number of persistent connections may be determined.

Optionally, the client may designate the processing process for processing the persistent connection establishment request, and the corresponding process may be as follows: if the persistent connection establishment request carries identification information of a third processing process, using the third processing process to process the persistent connection establishment request. Further, the processing of Step 202 may be as follows: if the persistent connection establishment request does not carry any identification information of any processing process, based on the locally stored number of current persistent connections of each processing process, determining the first processing process with the lowest number of current persistent connections.

In implementations, when starting the persistent connection establishment request, the client may designate a processing process for performing processing. For example, for network services involving a relatively large data amount, such as download of movies and of installation packages of games, during the initial stage of data interaction, the service data may be transmitted together with service data of other network services in the same persistent connection. During transmission, if the client finds the data amount of the network service is relatively large and needs to individually occupy a persistent connection, the client may re-establish a persistent connection with the original processing process of the server. Thus, the identification information of the original processing process may be directly written into the persistent connection establishment request.

As such, the persistent connection establishment request received by the server may carry the identification information of a certain processing process. Further, the server may determine a corresponding processing process (i.e., a third processing process) through the identification information. Further, the third processing process may be applied to process the persistent connection establishment request. It can be understood that, if after receiving the persistent connection establishment request transmitted by the client, the server finds the request includes no identification information of any processing process, processing of Step 202 may be executed. That is, the first processing process having the lowest number of current persistent connections may be directly determined based on the locally stored number of current persistent connections of each processing process.

It should be noted that, based on the processing of using the second processing process to receive the persistent connection establishment request, after the second processing process is received, whether the persistent connection establishment request carries identification information of the second processing process may be first determined. If yes, the second processing process may be used to directly process the persistent connection establishment request. If the persistent connection establishment request carries identification information of other processing processes or does not carry any identification information of any processing process, the server may use the SOCKET or the second processing process to forward the persistent connection establishment request to the managing process.

Optionally, when selecting a processing process to process the persistent connection establishment request, a plurality of persistent connection of the same client may be allocated as evenly as possible between a plurality of processing processes. Correspondingly, the processing of Step 202 may be as follows: based on the current persistent connections of each locally stored processing process, determining a preset number of processing processes with the lowest number of the current persistent connections; acquiring the identification information of the client carried in the persistent connection establishment request, and during the preset number of processing processes, determine the first processing process that has the lowest number of persistent connections established with the client.

In implementation, the managing process of the server may store a table of load information corresponding to each processing process, and each table of load information may include a plurality of records. Each record may correspond to one client and store the number of the persistent connections already established with the client in the current processing process. Thus, after the server receives a persistent connection establishment request sent by the client, the number of the persistent connections of each locally stored processing process may be acquired, and the plurality of processing processes having the lowest current load may be selected. That is, a preset number of processing processes having the lowest number of persistent connection established with the client may be determined. Further, among the preset number of processing processes, the first processing process with the lowest number of persistent connections established with the client may be determined.

It should be understood that, because the load condition of each client is different, the load amount of a persistent connection established by each client with the server is different. As such, even when the number of persistent connections established on two processing processes are the same, a relatively large difference may exist between the load amounts of the two processing processes. Thus, when selecting a processing process to process the request from the client to establish a connection, it should be ensured that the persistent connection establishment requests from the same client need to be as evenly distributed to a plurality of processing processes as possible for processing.

At Step 203, the client uses the first processing process to process the persistent connection establishment request.

In implementation, after determining the first processing process with the minimum number of current persistent connections, the client may use the first processing process to process the aforementioned persistent connection establishment request, namely, to establish a new persistent connection with the client through the first processing process. Further, the managing process may update the load information of the first processing process. That is, the number of the current persistent connections of the first processing process may be increased by one.

Figure 3:
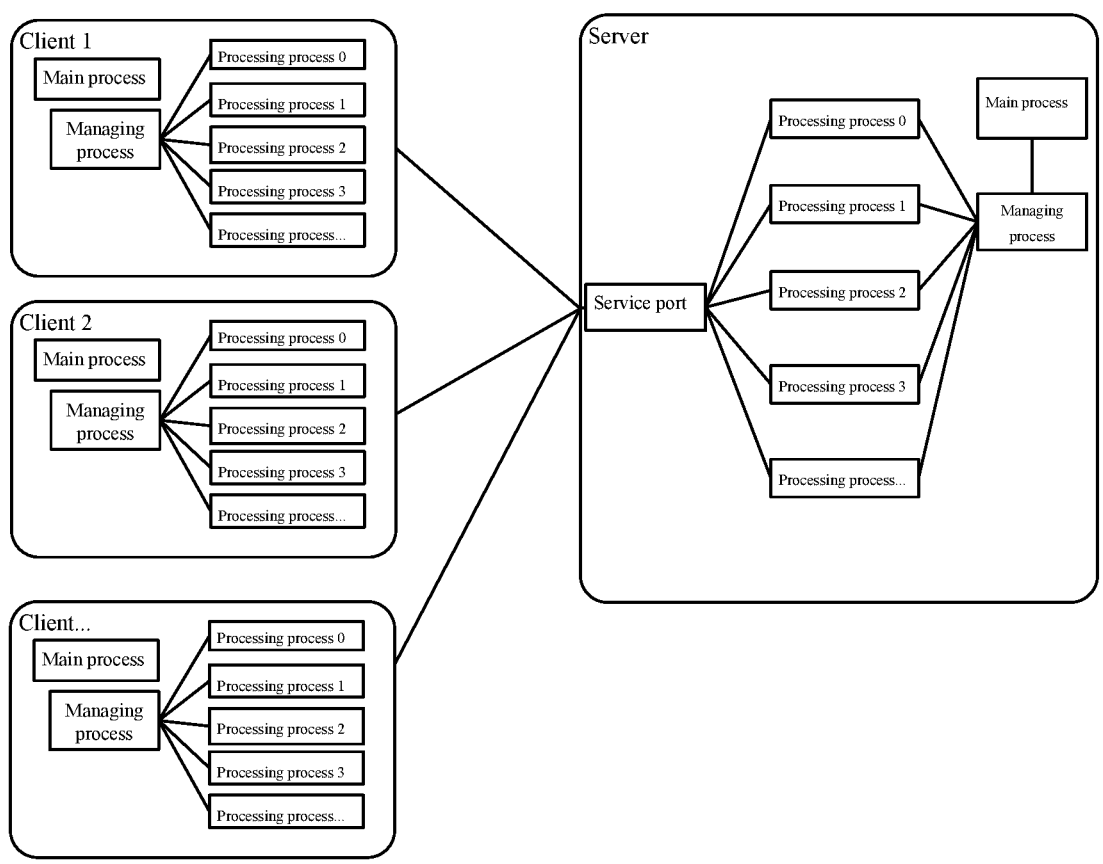
FIG. 3 illustrates a structural schematic view of a system for processing a persistent connection establishment request according to embodiments of the present disclosure.

It should be noted that, the disclosed client and server are models using multiplexed processes and multiple I/Os (Input/Output). As shown in FIG. 3, each processing process is individual to each other, which does not affect the stability of the main process and may fully utilize the system resources such as the multi-core CPU (central processing units).

Figure 4:
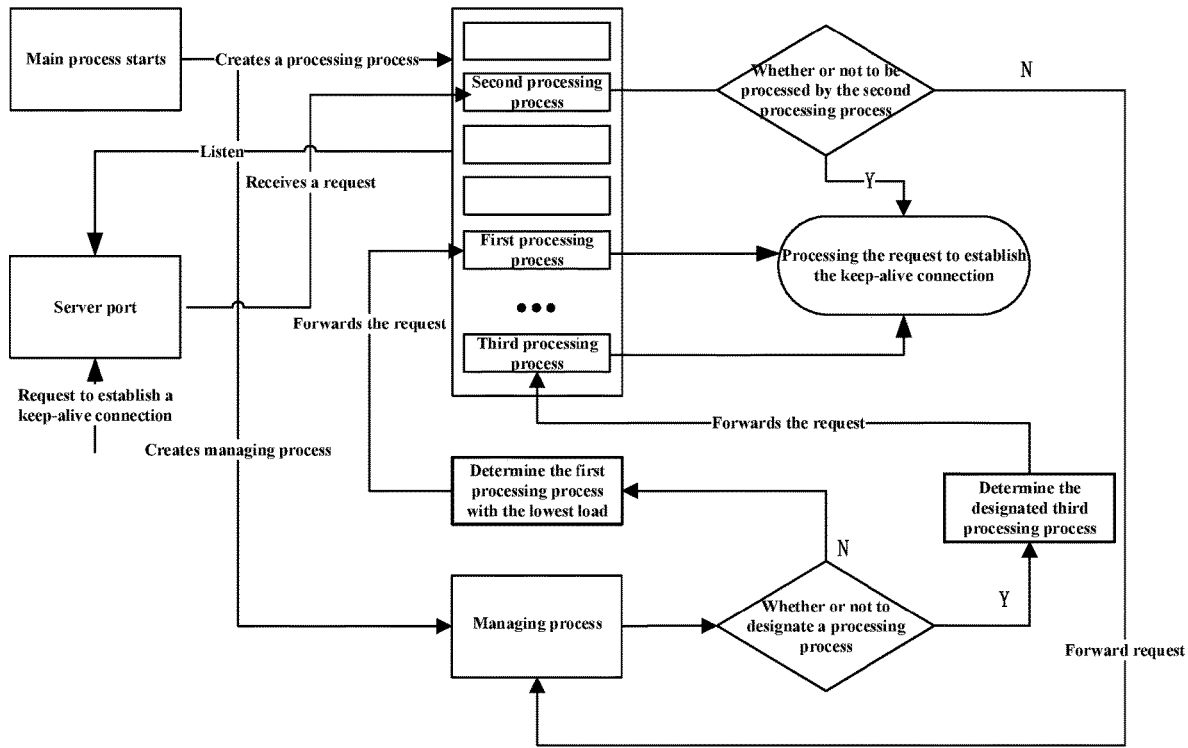
FIG. 4 illustrates a schematic view showing steps of processing a persistent connection establishment request according to embodiments of the present disclosure.

For ease of understanding, FIG. 4 illustrate the specific processing procedure of the disclosed server, where the main process may create the managing process and processing processes after being started. All processing processes listen to the service port, and the second processing process is selected to receive the persistent connection establishment request based on a certain order. Further, whether the persistent connection establishment request needs to be processed by the second processing process is determined. If yes, the request is processed by the second processing process, and if not, the persistent connection establishment request is forwarded to the managing process, and the managing process determines whether or not to designate a processing process. If yes, the request is processed by the designated third processing process; and if not, the first processing process is selected for processing the request according to a preset load balancing algorithm.

In embodiments of the present disclosure, the server receives the persistent connection establishment request sent by the client, and based on the locally stored number of current persistent connections of each processing process, the server determines the first processing process with the minimum number of current persistent connections and uses the first processing process to process the persistent connection establishment request. As such, when the server needs to establish the persistent connection with the client, the server may, from all the processing processes, select the processing process with the lowest load for processing. Accordingly, the load of the plurality of processing processes become balanced, and the utilization rate of server in processing the resources is improved.

Figure 5:
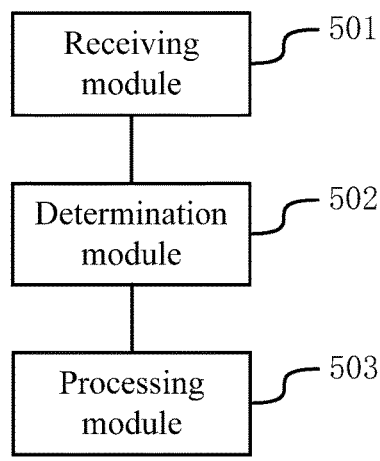
FIG. 5 illustrates a structural schematic view of a device for processing a persistent connection establishment request according to embodiments of the present disclosure.

Based on the same technical idea, embodiments of the present disclosure further provide a device for processing a persistent connection establishment request. As shown in FIG. 5, the device include followings.

A receiving module 501 is configured to receive a persistent connection establishment request sent by a client.

A determination module 502 is configured to, based on the locally stored number of current persistent connections of each processing process, determine a first processing process with a lowest number of current persistent connections.

A processing module 503 is configured to use the first processing process to process the persistent connection establishment request.

Optionally, the receiving module 501 is specifically configured to:
determine a second processing process based on a preset receiving order, and receive the persistent connection establishment request sent by the client through the second processing process.

Figure 6:
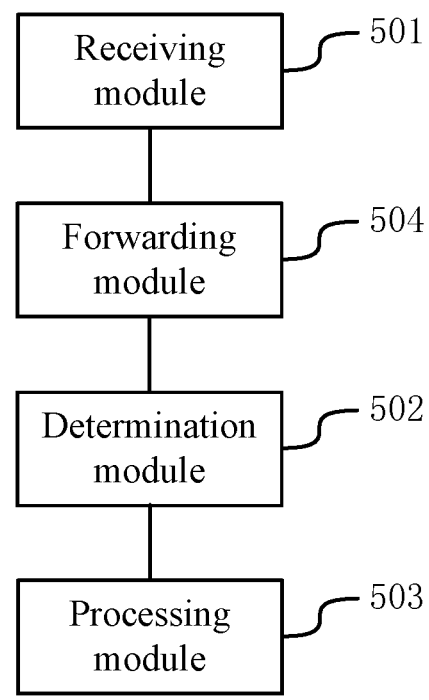
FIG. 6 illustrates a structural schematic view of a device for processing a persistent connection establishment request according to embodiments of the present disclosure.

Optionally, as shown in FIG. 6, the device further includes:
a forwarding module configured to, through the second processing process, use SOCKET to forward the persistent connection establishment request to a managing process.

The determining module 502 is specifically configured to:
based on the locally stored number of current persistent connections of each processing process, determine a first processing process with a lowest number of current persistent connections through the managing process.

Optionally, the processing module 503 is further configured to:

after receiving the persistent connection establishment request sent by the client, if the persistent connection establishment request carries identification information of a third processing process, use the third processing process to process the persistent connection establishment request.

The determining module 502 is specifically configured to:
if the persistent connection establishment request carries no identification information of any processing process, based on the locally stored number of current persistent connections of each processing process, determine the first processing process with the lowest number of current persistent connections Optionally, the determining module 502 is specifically configured to:
based on the locally stored number of current persistent connections of each processing process, determine a preset number of processing processes with the lowest number of current persistent connections;
acquire identification information of the client carried in the persistent connection establishment request, and determine the first processing process with the lowest number of current persistent connections established with the client, among the preset number of the processing processes.

In embodiments of the present disclosure, the server receives the persistent connection establishment request sent by the client, and based on the locally stored number of current persistent connections of each processing process, the server determines the first processing process with the minimum number of current persistent connections and uses the first processing process to process the persistent connection establishment request. As such, when the server needs to establish the persistent connection with the client, the server may select, from all the processing processes, the processing process with the lowest load for processing. Accordingly, the loads of the plurality of processing processes become balanced, and the utilization rate of server in processing the resources is improved.

It should be noted that: when the device for processing the persistent connection establishment request provided by the aforementioned embodiments processes the persistent connection establishment request, the division of the aforementioned functional modules are merely for illustrative purposes. In practical applications, the aforementioned functions may be implemented by different functional modules based on demand. That is, the internal structure of the device may be divided into different functional modules to implement all or partial of the above-described functions. Further, the device for processing the persistent connection establishment request provided by the aforementioned embodiments is based on the same idea behind the method embodiment for processing the persistent connection establishment request belong to the same idea, whose specific implementation process may refer to the method embodiments. Repeated descriptions are not provided herein.

Figure 7:
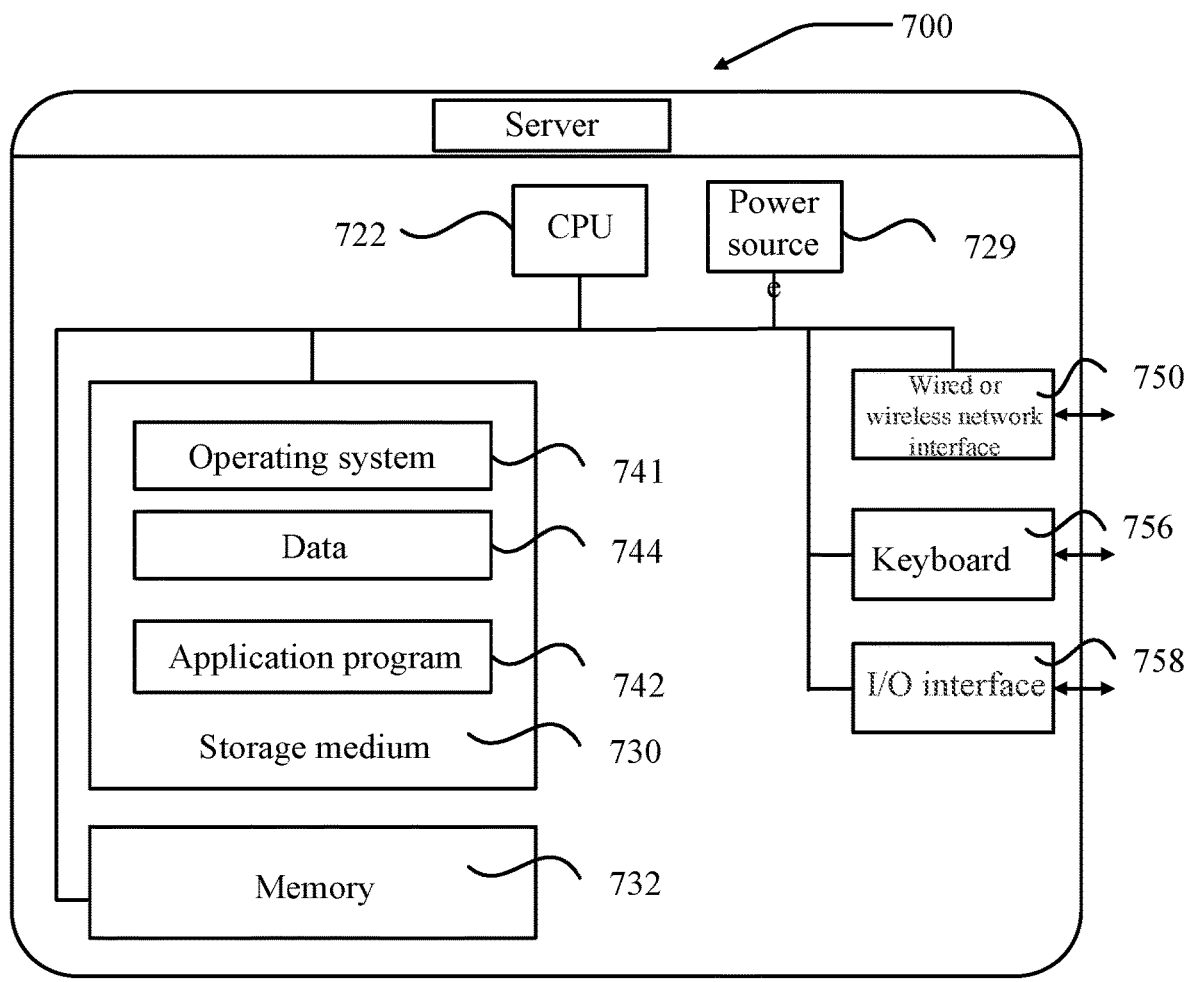
FIG. 7 illustrates a structural schematic view of a server according to embodiments of the present disclosure.

FIG. 7 is a structural schematic view of a server provided by embodiments of the present disclosure. The server 700 may vary largely due to the variance of configurations and performances, which may include one or more CPUs 722 (e.g., one or more processors), a memory 732, one or more storage application programs 742 or a storage medium 730 (e.g., one or more mass storage devices) of data 744. The memory 732 and the storage medium 730 may be temporary or persistent storage media. Programs stored in the storage medium 730 may include one or more modules (not labeled in the figure), and each module may include a series of instructional operations in the server. Further, the CPU 722 may be configured to communicate with the storage medium 730, and at the server 700, a series of instructional operations in the storage medium may be executed.

The server 700 may further include one or more power sources 726, one or more wired or wireless network interfaces 750, one or more I/O interfaces 758, one or more keyboards 756, and/or one or more operating systems 741, such as Windows Server™, Mac OS X™, Unix™, Linux™, and FreeBSD™.

The server 700 may include a memory, and one or more programs. The one or more programs may be stored in the memory, and may be configured to enable one or more processors to execute one or more programs including instructions for processing the aforementioned persistent connection establishment request.

Those ordinarily skilled in the relevant art may understand that all or partial steps of the aforementioned embodiments may be implemented by hardware, or may be implemented by using programs to instruct related hardware. The programs may be stored in the computer-readable storage medium, and the aforementioned medium may be a read-only memory, a magnetic disc, or an optic disc.

The foregoing is only preferred embodiment of the present disclosure, and is not intended to limit the present disclosure. Without departing from the spirit and principles of the present disclosure, any modifications, equivalent replacements and improvements shall all fall within the protection scope of the present disclosure.

What is claimed is:

1. A method for processing a persistent connection establishment request, comprising:
    receiving, by a server, the persistent connection establishment request sent by a client; and
    determining, by a server, a first processing process with a lowest number of current persistent connections, based on a locally stored number of current persistent connections of each processing process, wherein the first processing process is used to process the persistent connection establishment request,
    wherein receiving the persistent connection establishment request sent by the client comprises:
        determining a second processing process based on a preset receiving order, and
        receiving the persistent connection establishment request sent by the client through the second processing process,
    wherein the method further comprising:
    using a SOCKET to forward the persistent connection establishment request to a managing process, by the second processing process; and
    the determining of the first processing process with the lowest number of current persistent connections, based on the locally stored number of current persistent connections of each processing process, includes:
        determining the first processing process with the lowest number of current persistent connections, by the managing process, based on the locally stored number of current persistent connections of each processing process,
    after the receiving of the persistent connection establishment request sent by the client, the method further comprising:
    when the persistent connection establishment request carries identification information of a third processing process, using the third processing process to process the persistent connection establishment request; and
    the determining the first processing process with the lowest number of current persistent connections, based on the locally stored number of current persistent connections of each processing process, includes:
        when the persistent connection establishment request does not carry any identification information of any processing process, determining the first processing process with the lowest number of current persistent connections, based on the locally stored number of current persistent connections of each processing process.

2. The method according to claim 1, wherein the determining of the first processing process with the lowest number of current persistent connections, based on the locally stored number of current persistent connections of each processing process, comprises:
    determining a preset number of processing processes with the lowest number of current persistent connections, based on the locally stored number of current persistent connections of each processing process; and
    acquiring identification information of the client carried in the persistent connection establishment request, and determining the first processing process with the lowest number of persistent connections established with the client, among the preset number of the processing processes.

3. A server for processing a persistent connection establishment request, comprising:
    a memory, configured to store program instructions for performing a method for processing the persistent connection establishment request; and
    a processor, coupled with the memory and, when executing the program instructions, configured to:
    determine a second processing process based on a preset receiving order, and receive a persistent connection establishment request sent by a client through the second processing process;
    forward the persistent connection establishment request to a managing process, by the second processing process, using a SOCKET; and
    determine a first processing process with a lowest number of current persistent connections through the managing process, based on a locally stored number of current persistent connections of each processing process, wherein the first processing process is used to process the persistent connection establishment request,
    wherein the processor is further configured to:
        after receiving the persistent connection establishment request sent by the client, when the persistent connection establishment request carries identification information of a third processing process, use the third processing process to process the persistent connection establishment request; and
        when the persistent connection establishment request does not carry any identification information of any processing process, determine the first processing process with the lowest number of current persistent connections, based on the locally stored number of current persistent connections of each processing process.

4. The server according to claim 3, wherein the processor is further configured to:
    determine a preset number of processing processes with the lowest number of current persistent connections, based on the locally stored number of current persistent connections of each processing process; and acquire identification information of the client carried in the persistent connection establishment request, and determine the first processing process with the lowest number of persistent connections established with the client, among the preset number of the processing processes.

5. A non-transitory computer-readable storage medium, containing program instructions for, when executed by a processor, performing a method for processing the persistent connection establishment request according to claim 1 or 2.

* * * * *